United States Patent
Wandernoth et al.

(10) Patent No.: US 6,473,213 B1
(45) Date of Patent: Oct. 29, 2002

(54) PROCESS AND SYSTEM TO OPTIMIZE OPTICAL INTER-SATELLITE LINKS

(75) Inventors: Bernhard Wandernoth, Kirchberg; Edgar Fischer, Muellheim Dorf, both of (CH)

(73) Assignee: Contraves Space AG, Zurich (CH)

( * ) Notice: Subject to any disclaimer, the term of this patent is extended or adjusted under 35 U.S.C. 154(b) by 0 days.

(21) Appl. No.: 09/164,587

(22) Filed: Oct. 1, 1998

(30) Foreign Application Priority Data

Oct. 1, 1997 (CH) .............................................. 2299/97

(51) Int. Cl.[7] ........................ H04B 10/22; H04B 10/10; H04B 10/24
(52) U.S. Cl. ........................ 359/159; 359/161; 359/172
(58) Field of Search ................................ 359/110, 153, 359/159, 172, 152, 161; 370/535

(56) References Cited

U.S. PATENT DOCUMENTS

| | | | |
|---|---|---|---|
| 4,330,870 A | * 5/1982 | Arends | 455/617 |
| 4,995,101 A | * 2/1991 | Titteron et al. | 455/607 |
| 5,119,225 A | * 6/1992 | Grant et al. | 359/172 |
| 5,247,381 A | * 9/1993 | Olmstead et al. | 359/118 |
| 5,592,320 A | * 1/1997 | Wissinger | 359/159 |
| 5,808,760 A | * 9/1998 | Gfeller | 359/110 |
| 5,909,296 A | * 6/1999 | Tsacoyeanes | 359/152 |
| 6,091,529 A | * 7/2000 | Fisher et al. | 359/172 |
| 6,239,888 B1 | * 5/2001 | Willebrand | 359/118 |
| 6,285,481 B1 | * 9/2001 | Palmer | 359/159 |

FOREIGN PATENT DOCUMENTS

EP        0 325 429        7/1989

OTHER PUBLICATIONS

English language document corresponding to Swiss patent 1996 2415/96 and European application 97111740.3.
Kenington, P.B., "Electronic tracking systems for space communications.", Electronics And Communication Engineering Journal, Bd. 2, Nr. 3, Jun. 1, 1990.
Aschmoneit, E.K., "Optische systeme fuer die satelliten–kommunikation", NTZ Nachrichtentechnische Seitschrift, Bd. 46, Nr. 1, Jan. 1, 1993.
Hacker, G., "Lasersignale im weltraum.", Finkschau, Bd. 60, Nr. 26, Dec. 16, 1988.

* cited by examiner

Primary Examiner—Leslie Pascal
(74) Attorney, Agent, or Firm—Browdy and Neimark, P.L.L.C.

(57) ABSTRACT

The system for the optimization of inter-satellite links has a terminal comprising a multiplexer (1) which is connected to the output of a transmission unit (2) and has a subchannel input that is connected to an evaluation unit (3). The terminal also has a demultiplexer (5), which is connected to the input of a receiver unit (6) and has a subchannel output that is connected to an optimization unit (8). With the aid of an auxiliary channel established through the multiplexer and demultiplexer in addition to the transmission channel present for user-information data, it becomes possible to transmit operation-internal data pertaining to at least one continually measured parameter to the optimization unit of the opposite terminal via the evaluation unit (3).

9 Claims, 3 Drawing Sheets

PROCESS AND SYSTEM TO OPTIMIZE OPTICAL INTER-SATELLITE LINKS

FIELD OF THE INVENTION

The present invention relates to a process and system to optimize optical inter-satellite links.

REVIEW OF THE RELATED TECHNOLOGY

Optical free-space communication between satellites and between a satellite and the ground station will gain importance in the near future because it represents, among other factors, a weight-saving alternative to the existing microwave technology onboard the satellites.

So-called optical terminals consist of one or several telescopes that restrict the angular range of the visual field of an optical receiver in the direction of an opposite station and also guarantee the directional emission of the signals to be sent. A number of movable optical elements are furthermore provided to align the direction of transmission and reception.

Besides the direct detection of the optical output of the opposite station as the method of transmission, an important role also falls to the coherent heterodyning of the received light with the light of the same frequency from a local oscillator laser. This is because both a high sensitivity to the signal to be detected and an insensitivity to interferences by radiation present in the background are important.

The major advantage of using light instead of high-frequency waves as the transmission medium is the resulting higher system efficiency based on the shorter wavelength (by a factor of 10,000) and the consequent higher antenna gain.

The main difficulty, however, results from the fact that the smaller beam divergence requires a high alignment accuracy of the transmitter and receiver telescopes with great precision and long-term stability of the mechanisms of the optical communication terminal. The sometimes-high relative speeds of the satellites furthermore require that a point-ahead between the alignment of the receiver and transmitter telescopes be calculated and precisely adjusted.

These demands for precision result in highly complex and expensive mechanisms which, to ensure their long-term stability, must be readjusted at regular intervals with the aid of special apparatus. Furthermore, a high safety margin is required for the transmitter output. The resulting high system complexity, high cost, and high energy consumption often make the use of light unattractive in comparison with the high-frequency technology.

SUMMARY OF THE INVENTION

It is therefore the object of the present invention to prevent the above shortcomings of the prior art.

This object is accomplished according to the invention with a process which allows the terminals to transmit operation-internal data that need not necessarily be visible to the operator of the terminal, making it possible to carry out adjustments and compensate for age-related changes in addition to performing the terminal-internal network management.

The process of the invention has the advantage that it permits, in an exceptional manner, the use of an auxiliary channel to continually monitor and optimize: the calibration and adjustment of the opto-mechanical components; the frequency accuracy and adjustment ranges of the oscillators; and the level of transmission power of an optical transmission terminal while it is in operation. This considerably reduces the requirements for manufacturing accuracy and slow aging over the course of the useful life, and also makes it possible to reduce the terminal's power consumption.

It furthermore overcomes the shortcoming of the prior art that the satellite operator can measure and subsequently readjust the actual orbits of his satellites only via orbit measurements performed from ground stations.

With the process of the invention, in contrast, the demands on the accuracy of the orbit and position measurement on one hand may be lower, and the actual orbit/position data on the other hand can be calculated and subsequently implemented much more precisely if the exact distance between the satellites and their exact alignment are first calculated with the process of the invention.

Further details, features and advantages of the invention result not only from the claims and characteristics described therein—by themselves and/or in combination with each other—but also from the following description of a sample embodiment.

BRIEF DESCRIPTION OF THE DRAWING

The above and other objects and the nature and advantages of the present invention will become more apparent from the following detailed description of an embodiment taken in conjunction with drawings, wherein.

DETAILED DESCRIPTION OF THE PREFERRED EMBODIMENT

Figure 1:
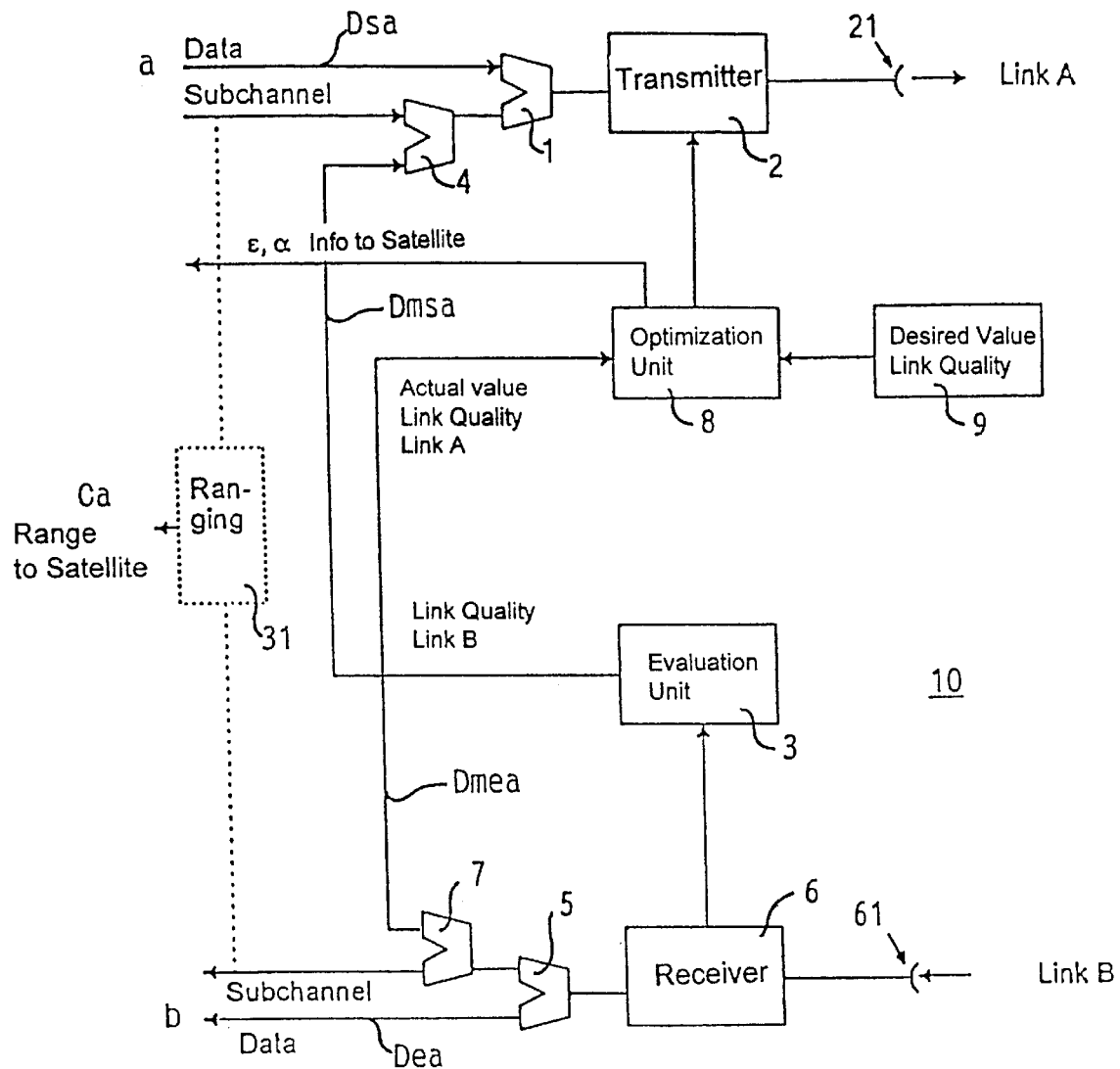
FIG. 1 is a sample block diagram for an implementation of the system of the invention in transmission mode between two satellites.
Figure 2:
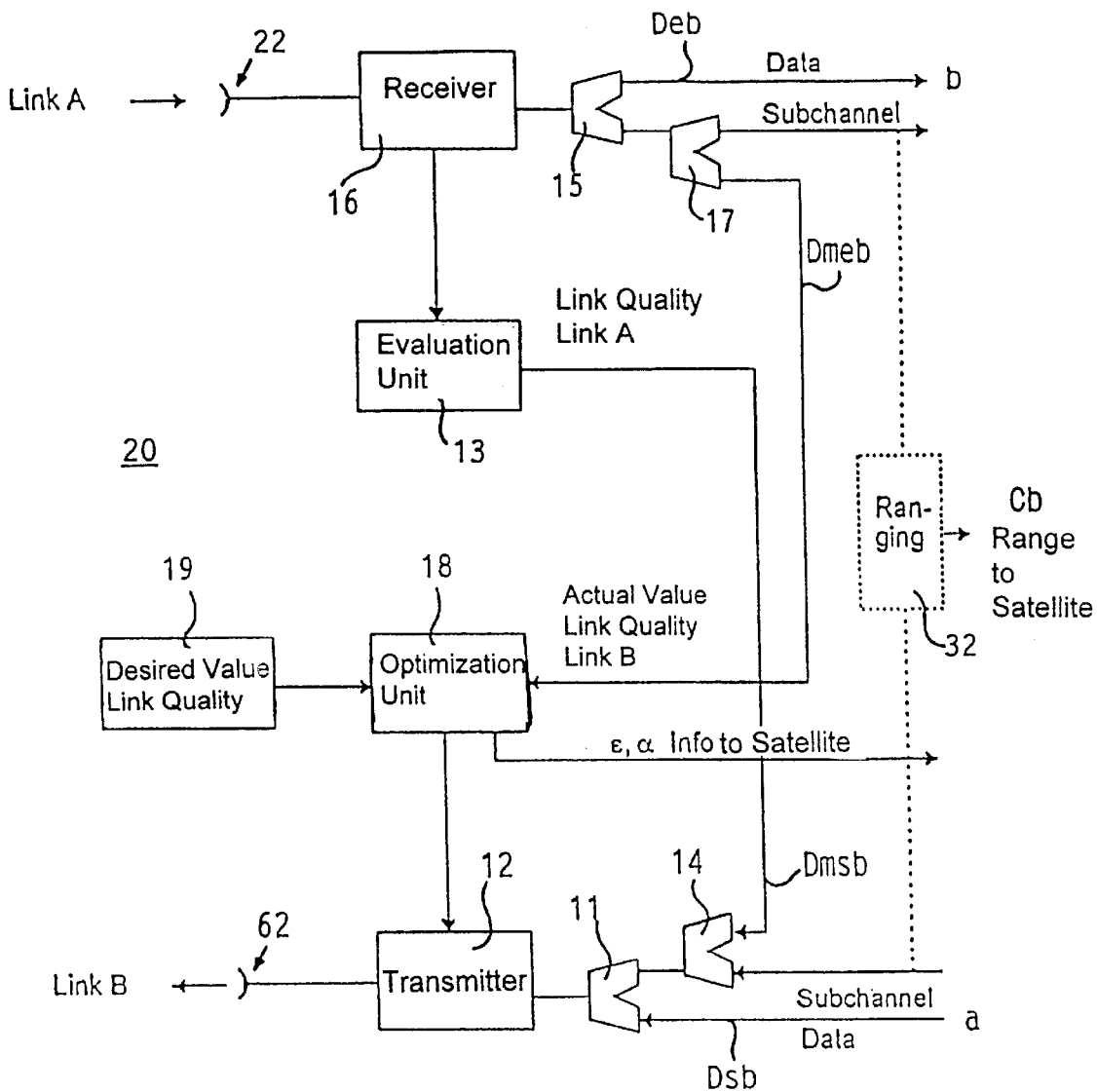
FIG. 2 is a sample block diagram for an implementation of the system of the invention in reception mode between two satellites.

The process of the invention may be performed, for example, with the aid of a terminal 10 as shown in FIG. 1, and an opposite terminal 20 as shown in FIG. 2. The terminals 10 and 20 are also referred to as the first and second station. Terminal 10 contains a subchannel multiplexer 1, whose output signal is routed to a transmission unit 2. A number of operating data signals Dsa, transmitted at a high bit rate and already separately multiplexed, and a subchannel data signal Dmsa, generated in an evaluation unit 3 and optionally routed through an additional multiplexer 4 for additional subchannel signals, may be sent to the input of the multiplexer 1, for example. The terminal 10 also contains a subchannel demultiplexer 5, which is connected to the input side of a reception unit 6 and designed, for example, to emit on its output side a number of multiplexed operating data signals Dea at a high bit rate, as well as a subchannel data signal Dmea, which may optionally be routed via a demultiplexer 7 providing additional subchannel signals, to an optimization unit 8, which provides control signals for the transmission unit 2, for example via a bus. The evaluation unit 3 and/or the optimization unit 8, which is connected to a setting device 9, may be microprocessors. A first antenna (optical telescope) 21 may be connected to the transmission unit 2, for example, and a third antenna (optical telescope) 61 may be connected to the reception unit 6.

The opposite terminal 20 contains a subchannel multiplexer 11, the output signal of which is routed to a transmission unit 12. On its input side, the subchannel multiplexer 11 may receive, for example, a number of already separately multiplexed user-information data signals Dsb transmitted at a high bit rate, as well as a subchannel data signal Dmsb, which is generated in an evaluation unit 13 and optionally routed through an additional multiplexer 14. The opposite terminal 20 also has a subchannel demultiplexer 15, which is connected on its input side to a reception unit 16, and which is designed to generate, for example, on its output side, a number of multiplexed user-information data signals Deb at a high bit rate, as well as a subchannel data signal Dmeb, which may optionally be routed through an additional demultiplexer 17 to an optimization unit 18 that generates the control signals for a transmission unit 12, for example via a bus. The evaluation unit 13 and/or the optimization unit 18, which is connected to a setting device 19, may be microprocessors. A fourth antenna (optical telescope) 62 is connected to the transmission unit 12, for example, and a second antenna (optical telescope) 22 to the reception unit 16.

The optimization of a predetermined operating parameter in the terminal 10 based on the system illustrated in FIGS. 1 and 2, is attained as follows:

The data signals Dsa are transmitted via the multiplexer 1 to the transmission unit 2, from where they are transmitted via the first optical telescope 21. The data signals accordingly received by the second optical telescope 22 and the reception unit 16 of the opposite terminal are processed or evaluated in the evaluation unit 13, which therefore generates evaluation signals containing information regarding the transmission quality of transmitted signals in dependence on a predetermined parameter. Such parameters could pertain, for example, to the transmission power, the point-ahead, the system adjustment, the frequency tuning. The transmission from the transmission unit 2 to the reception unit 16 is referred to as "Link A."

The evaluation signals may optionally be routed via the additional multiplexer 14 to the subchannel input of the subchannel multiplexer 11 and transmitted in interleaved intervals or multiplexed, via the transmission unit 12 and the fourth antenna (optical telescope) 62, to the terminal 10. The signals received via the third antenna (optical telescope) 61 and the reception unit 6 are demultiplexed with the demultiplexer 5 and routed to one of the inputs of the optimization unit 8, where these signals are compared with the signals of the desired value obtained from the setting device 9 to generate control signals that act on a characteristic of the transmitter or terminal 10 to which the respective parameter pertains. The optimization unit 8 controls the optimization process iteratively until a desired optimum condition is attained according to predetermined specifications. The signals may optionally also be demultiplexed further at the output of the demultiplexer 5 via the optional additional demultiplexer 7.

Because of the symmetrical configuration of the terminals, the same applies for the optimization of the respective parameter in terminal 20 through the systems shown in FIGS. 1 and 2, with the transmission distance between the transmission unit 12 and the reception unit 6 referred to as "Link B".

If the parameter pertains to the transmission power of one of the terminals, the process of the invention permits adjustment of the transmission power to exactly the level momentarily required in the other terminal. To achieve this, the reception quality is measured (e.g., based on the bit error probability) as the operating parameter and transmitter. This makes it possible to save a considerable amount of power and also extend the life of the optical transmitters, considering that the transmission power of systems without the process according to the invention is up to 6 dB above the actually required level, for safety reasons.

If the parameter pertains to the point-ahead, it must be noted that the point-ahead of the transmitter beam with respect to the receiver orientation must be calculated and set. If, however, the transmitter and receiver can exchange information regarding reception quality and beam orientation via the auxiliary channel, the point-ahead may be set with a relatively high tolerance since the angle can be optimized after the link has been established. This may be done, for example, with slight periodic and circular adjustments (conical scan) by the transmission unit, so that the information regarding the reception quality at the opposite terminal as the operating parameter can be used to optimize the beam orientation. This process not only results in lesser tolerance demands on all mechanisms and on the precision of the beam orientation than without this process, at the same time it also compensates for the aging of mechanisms and of optical elements affecting the angles. No additional positioning or sensor elements are required because they must already be present to set the point-ahead.

If the parameter pertains to the system adjustment, it must be noted that the optical setting of all involved optical and mechanical parts is essential for the precise orientation of the telescope. To achieve this, the parts must not only be precisely set during manufacturing, but the setting must be guaranteed over the entire useful life of the part. This is possible either with very expensive design measures or with measuring and readjustment devices that necessitate the interruption of the terminal transfer mode. If the setting deviations (design or age-related) are measured via the existing communication link in the manner described under the point-ahead, a continual adjustment can be performed during the operation without the need to interrupt the link. This reduces the demands on the manufacturing accuracy and age stability, therefore also resulting in lower costs.

If the parameter pertains to the frequency tuning, it must be noted that the frequency tuning in coherent-optical transmission systems is nearly as complex as the beam orientation. The local oscillator in the receiver must exactly follow the frequency of the transmitting oscillator. Both lasers must have a large tuning range to compensate for shifts and aging. The auxiliary channel may be used not only for a frequency management across networks (see the Swiss patent application CH-2307196) but also for monitoring the limits of the tuning range for all lasers. If, for example, the local oscillator reaches a limit of its tuning range, an appropriate tuning of the transmitter oscillator can be induced via the auxiliary channel. A different frequency range may optionally also be selected in this manner. This measure significantly reduces the demands on the calibration and results in a high long-term stability.

In a further development of the invention, a so-called ranging unit 31 (FIG. 1) or 32 (FIG. 2) generating a ranging signal Ca or Cb, respectively, may be integrated between subchannel connections of the additional multiplexers 4 and 7 of the terminal 10, or between subchannel connections of the additional multiplexers 14 and 17 of the terminal 20. With this ranging signal, the satellite can determine the exact distance to the opposite satellite (see also the Swiss patent application CH-2415196).

Figure 3:
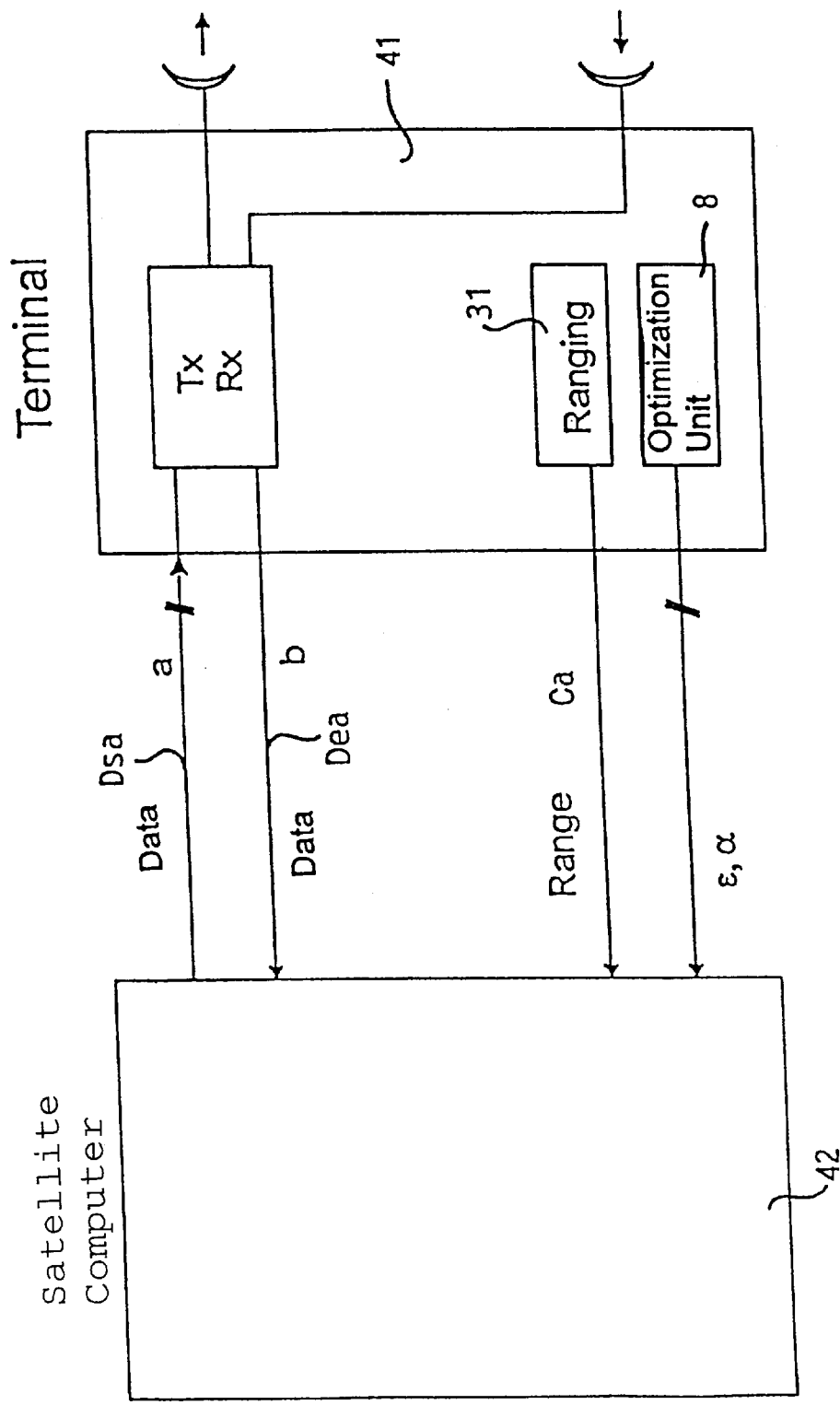
FIG. 3 is a sample block diagram for an implementation of a further design of the system of the invention.

FIG. 3, for example, shows a schematic presentation of a terminal 41 equipped with a ranging unit 31, in which the optimization unit 8 also provides the angle values e and a, whereby the terminal 20 may have a similar design. In other respects the terminal 41 is preferably like the terminal 10 in FIG. 1. FIG. 3 also shows the connections between the terminal 41 and a satellite computer 42 for the signals e, a, Ca, Dsa and Deal Such signals may also be treated as in patent application EP-97111740.3 or 97108286.2 or 97108287.0.

The above descriptions merely represent example embodiments to which the invention is expressly not limited, but they are meant to include similar systems as well. Specifically, the invention is not limited to digital multiplexers/demuitiplexers. The same principle can also be used, for example, for frequency or wavelength or polarization multiplexing. The evaluation units may, specifically, also perform a pre-treatment of data with respect to an evaluation, with the respective optimization unit performing the final evaluation. An evaluation-signal unit 3 and/or 13 of this type could then be connected to the reception unit and/or to the output of at least one of the multiplexers 5, 7, 15, 17, whereby the term "evaluation-signal unit" also refers to an evaluation unit.

The invention extremely simplifies and accelerates the establishment of intersatellite links and reduces the expenditures in the ground stations in comparison to the prior art. The system according to FIG. 3 permits a highly accurate orbit measurement and determination of the position of a satellite.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. A process for optimizing a parameter of a transmission-reception channel between satellite terminals of an optical beam inter-satellite link for satellites traveling in space at high speeds, the transmission-reception channel including a data channel transmitting user-information data, the process comprising steps of:
providing an auxiliary channel, distinct from the data channel, in the transmission-reception channel;
continually measuring a parameter value of the parameter with an evaluation unit at a first one of the terminals;
transmitting the parameter value to a second one of the terminals over the auxiliary channel;
generating a control signal from the transmitted parameter value with an optimization unit in the second terminal; and
correcting, at the second one of the terminals, the parameter value toward a desired value;
whereby the link is optimized with respect to the parameter;
wherein the parameter comprises point-ahead, the step of measuring the parameter value includes evaluating beam orientation, and the control signal includes information regarding the beam orientation; whereby setting of the point-ahead is performed with a high tolerance and beam angle is optimized after the link has been established.

2. The process according to claim 1, wherein the step of correcting the parameter value includes a continual adjustment by measuring setting deviations via the link during operation thereof without interruption of the link.

3. The process according to claim 1, wherein at least two parameters are optimized, and comprising steps of sequentially optimizing a first parameter and subsequently optimizing a second parameter in interleaved time intervals.

4. The process according to claim 1, comprising steps of multiplexing and demultiplexing at different terminals, wherein the data channel and the auxiliary channel are carried on one beam.

5. The process according to claim 1, including steps of making slight periodic and circular adjustments of the beam angle at the second terminal.

6. The process according to claim 5, wherein the circular adjustments include a conical scan.

7. A satellite terminal of a first satellite for an optical beam inter-satellite link with a second satellite, the satellites travelling in space at high speeds, comprising:
a beam transmitter;
a beam receiver;
a multiplexer coupled to an input side of the transmitter and including a subchannel input coupled to an evaluation unit; and
a demultiplexer coupled to an output side of the receiver and including a subchannel out put coupled to an optimization unit outputting parameter value optimization feedback signals therefrom;
whereby in a multi-satellite system comprising a plurality of the terminals, the parameter is continually optimized via an auxiliary channel of the link, the auxiliary channel being multiplexed with a data channel transmitting user information
wherein: the evaluation unit is coupled to an additional multiplexer coupled to the multiplexer on an input side thereof; an additional demultiplexer is connected to the demultiplexer on an output side thereof; and said terminal further comprises a ranging unit coup led between the additional multiplexer and the additional demultiplexer, the ranging unit being coupled to a satellite computer.

8. The terminal according to claim 7, comprising a setting device coupled to the optimization unit; wherein the evaluation unit is coupled to the receiver; and wherein the optimization unit is coupled to the transmitter.

9. The terminal according to claim 7, wherein the optimization unit is coupled to a satellite computer to send angle signals (e, a) or ranging signals (Ca, Cb) to the computer, whereby orbit and position measurements of satellites in the multi-satellite system are precisely determined.

* * * * *